United States Patent
Liu et al.

(10) Patent No.: US 11,764,629 B2
(45) Date of Patent: Sep. 19, 2023

(54) IN-SLOT COOLING SYSTEM FOR AN ELECTRIC MACHINE WITH HAIRPIN WINDINGS

(71) Applicant: DELTA ELECTRONICS, INC., Neihu (TW)

(72) Inventors: Changhong Liu, Northville, MI (US); Ali Yousefzadi Nobakht, Detroit, MI (US); Raymond Ong, Novi, MI (US)

(73) Assignee: DELTA ELECTRONICS, INC., Neihu (TW)

( * ) Notice: Subject to any disclaimer, the term of this patent is extended or adjusted under 35 U.S.C. 154(b) by 93 days.

(21) Appl. No.: 17/132,290

(22) Filed: Dec. 23, 2020

(65) Prior Publication Data
US 2022/0200382 A1      Jun. 23, 2022

(51) Int. Cl.
| | | |
|---|---|---|
| H02K 3/24 | (2006.01) | |
| H02K 9/193 | (2006.01) | |
| H02K 3/487 | (2006.01) | |
| H02K 3/34 | (2006.01) | |

(52) U.S. Cl.
CPC .............. *H02K 3/24* (2013.01); *H02K 3/345* (2013.01); *H02K 3/487* (2013.01); *H02K 9/193* (2013.01)

(58) Field of Classification Search
CPC .......... H02K 3/24; H02K 3/345; H02K 3/487; H02K 9/193; H02K 9/19; H02K 9/197; H02K 1/16; H02K 1/165; H02K 1/20
USPC ............... 310/54, 58, 59, 216.101, 216.102, 310/216.103
See application file for complete search history.

(56) References Cited

U.S. PATENT DOCUMENTS

| | | | |
|---|---|---|---|
| 6,515,384 B1* | 2/2003 | Kikuchi | H02K 1/20 310/58 |
| 8,629,585 B2 | 1/2014 | Bradfield | |
| 9,099,900 B2 | 8/2015 | Glubrecht | |
| 10,158,263 B2 | 12/2018 | Dlala et al. | |
| 2002/0074871 A1* | 6/2002 | Kikuchi | H02K 3/487 310/58 |
| 2006/0163954 A1* | 7/2006 | Biais | H02K 3/493 310/54 |
| 2013/0140924 A1* | 6/2013 | Glubrecht | H02K 1/20 310/59 |
| 2013/0294899 A1* | 11/2013 | Jones | F01D 9/00 415/177 |

FOREIGN PATENT DOCUMENTS

| | | |
|---|---|---|
| CN | 108886282 A | 11/2018 |
| EP | 2523312 A1 | 11/2012 |
| WO | 2013085917 A1 | 6/2013 |

* cited by examiner

*Primary Examiner* — Michael Andrews
(74) *Attorney, Agent, or Firm* — Edward C. Kwok; VLP Law Group LLP

(57) ABSTRACT

In a stator stack an in-slot cooling system that includes: (a) two or more conductors of a hairpin winding provided within each slot in a first group of the slots, each conductor running axially across the stator stack and being at a different predetermined radial distance from an air gap; and (b) adjacent each slot of the first group of slots at the end that is in the vicinity of the air gap, a bridge portion of the laminating material that closes the slot and forms in the stator stack substantially adjacent the conductor having the shortest predetermined distance from the air gap an axial cooling channel that allows a coolant to flow therein without leakage therefrom.

18 Claims, 16 Drawing Sheets

IN-SLOT COOLING SYSTEM FOR AN ELECTRIC MACHINE WITH HAIRPIN WINDINGS

BACKGROUND OF THE INVENTION

1. Field of the Invention

The present invention relates to a cooling system for an electric machine (e.g., an electric motor, an electric generator, or any suitable electric machine). In particular, the present invention relates to a cooling system designed for use in a stator of an electric machine with hairpin windings.

2. Discussion of the Related Art

Vehicle electrification has been widely recognized to be effective in reducing $CO_2$ emissions. Key to an electric vehicle are the various electric machines it deploys—including, for example, a traction motor, a generator, a starter, and an alternator. Due to the constraints of battery capacity and the very limited space under the hood, as well as the cost pressure from their conventional internal combustion engine (ICE) counterparts, these electric machines are facing increasing demands on their power densities, efficiencies and costs. According to a roadmap from U.S. Department of Energy (DOE), the power density of an electric traction motor is expected to be as high as 50.0 kW/L in 2025, which is a significant jump from the 5.7 kW/L average energy density achieved in 2020. Fundamentally, there are two factors that limit the motor power or the torque density—(i) the total loss inside a given volume (i.e., heat source), and (ii) the heat dissipation capability. The heat dissipation capability refers to the cooling system's design and capability.

Common cooling systems for electric traction motors or generators in electric vehicles (e.g., battery electric vehicle (BEV), hybrid electric vehicle (HEV), or plug-in hybrid electric vehicle (PHEV)) include water-cooling systems, oil-cooling systems, and hybrid cooling systems (i.e., systems that use both oil and water as coolants).

In a water-cooling system, the stator stack is surrounded by a well-sealed water jacket. The coolant (e.g., a mixture of water and glycol) flows inside the jacket and removes heat from both the stator core and its windings. To improve cooling, the clearance between the stator stack and the water jacket is kept as small as possible to minimize thermal resistance. Therefore, shrink-fit is a preferable way to assemble the water jacket on the stator stack. However, even with the best shrink-fit, the temperature of the stator cannot be maintained uniform. The windings are the hottest part of the stator. This is because copper wire, especially the conductor closest to the air gap, is located farthest from the water jacket—i.e., to reach the water jacket, heat from the copper wires typically passes through the enamel, vanish, slot liner, and lamination. Any air clearance between any two of these layers would adversely affect—i.e., increase—the temperature at the copper wires of the stator.

One oil-cooling design sprays or drips oil directly on the end windings. In fact, as explained below in further detail, a discrete uniformly spreading end-turn profile of a hairpin winding exposes a greater surface area to the coolant relative to a stranded end winding. Accordingly, oil cooling is for a stator with a hairpin winding is more effective relative to a stranded end winding. Together with the cooling at the back of a stator (e.g., oil dropping, oil jacket, or water jacket), the overall temperature in the copper wires may be further reduced.

To reduce energy loss from heat generated in the windings ("copper loss") and to increase efficiency, electric motor suppliers are increasingly tending to replace conventional stranded windings with rectangular hairpin windings. Compared to round stranded windings, a hairpin winding—which is inserted axially from the electric motor end—provides a significant improvement in the slot-fill factor and the end-turn lengths, thereby resulting in both a reduced winding DC resistance and reduced copper loss. The improved slot-fill factor reduces the clearance between the copper windings and the slot wall. The resulting smaller thermal resistance is beneficial to dissipating heat from the copper windings to the lamination, and then to the water jacket. For example, FIG. 1 shows the end-turn winding profile of electric machine stator stack 100 with a hairpin winding, which results in a uniform discrete end-turns architecture that provides a greater surface area to the coolant media. In that configuration, cooling from the oil sprayed on the end-turns is more effective than cooling from the oil sprayed on stranded winding. Consequently, the improved efficiency in cooling results in a more compact and less costly electric motor.

Hairpin windings, however, suffer from significant AC copper losses due to eddy currents and proximity effects from the alternating magnetic fields. Generally, a longer eddy current circulation path leads to a larger AC copper loss. Conventional approaches to mitigating such copper losses include using laminated steel sheet, rather than solid steel, and using bundles of stranded thin copper wires in the slot, rather than wires of larger diameters. Without appropriate design safeguards, the AC-resistance to DC-resistance $$\left(\frac{R_{AC}}{R_{DC}}; \text{``AC effect''}\right)$$

of a hairpin winding may be as high as 3 or 4, when the electric machine operates at about 1000 Hz (e.g., at 15000 rpm for an 8-pole electric machine). Such an AC effect indicates a potential risk for an electric motor operating at high speed. One approach to reducing the AC effect is to split each thick rectangular wire into multiple smaller conductors. For example, FIG. 2 shows cross-sections 201, 202, and 203, each corresponding to a slot in a stator of an electric machine. As shown in FIG. 2, cross-sections 201, 202, and 203 correspond to 4-wires per slot, 6-wires per slot, and 8-wires per slot configurations, respectively. As the number of conductors in each slot increases, the AC effect is reduced. At the same time, however, the twisting, welding, and connection of the end-turns become much more complicated. Thus, a compromise design must achieve a balance between the AC effect and the complexity in winding processing.

Not all conductors within a slot need to be the same. For example, FIGS. 3(a), 3(b), and 3(c) show cross-sections 301, 302, and 303, each corresponding to a slot in a stator of an electric machine, having 4-wires per slot, 6-wires per slot, and 8-wires per slot configurations, respectively, with variations in identical parallel branches and series turns per phase. In the slot of cross-section 301, identical conductors 310-313 are provided. In the slot of cross-section 302, conductors 320-323 correspond to one-to-two parallel splitting of conductors 310-311 of cross-section 301. (Conductor 324 and 325 correspond to conductors 312-313 of cross-section 301). Likewise, in the slot of cross-section 303, conductors 330-337 each correspond to one-to-two parallel splitting of wires 310-313 of cross-section 301. Cross-section 303 achieves the best AC effect, although involving higher manufacturing complexity.

FIG. 4 shows AC effects 401 and 402, corresponding to the wiring configurations of cross-section 301 and 302, as a function of the operating frequency of the electric machine.

FIG. 4 shows that, by splitting conductors 310 and 311 to conductors 320-323, the AC effect may be reduced by 32% at or about 1100 Hz. FIGS. 5(a) and 5(b) show, for cross-sections 301 and 302, respectively, the distribution of copper loss within each slot. FIGS. 1-5 show that thinner rectangular wires are effective in reducing both the overall AC resistance and copper loss. However, as seen from FIGS. 5(a) and 5(b), in both cross-sections 301 and 302, the highest loss density is attained at the conductor closest to the air gap (e.g., conductors 311 and 321). In most cases, the in-slot part of the top conductor (i.e., the part located closest to the air gap) is the hottest spot in the winding for an electric motor with an oil-spray-on-end-windings system or a hybrid cooling system with a water jacket.

However, with the increasing demand for power density, especially in high-power electric machines, even the hybrid cooling system—e.g., with both oil spray capability and a water jacket—may not be enough. Various improvements have been developed. For example, U.S. Pat. No. 10,158, 263 ("Dlala") discloses creating holes on lamination to form axial coolant channels along with either the stator tooth or the stator yoke. For example, Dlala's FIG. 1 shows providing thin, long, axial cooling channels 101 located in stator teeth 103 of an electric machine, in between and near slots 105. Likewise, Dlala's FIG. 2 shows providing three circular cooling channels 201 in each stator tooth of stator yoke 203. As compared to cooling from the back of the stator ("back cooling"; e.g., from a water jacket), cooling channels inside the stator stack are closer to the windings, which avoids the thermal resistance between the back of the stator and the housing. However, Dlala's cooling channels increase magnetic resistance, which results in a reduction of the effective torque or power.

European Patent Application Publication 2,523,312 discloses, instead of cooling channels provided along the magnetic path, cooling pipes inserted in each slot of a stator. This approach is similar to the hollow-conductor cooling system commonly used in large electric machines. However, as the wall of each cooling pipe would inevitably have a thickness and a cross-section, such in-slot cooling pipes are appropriate only for larger electric machines.

Chinese Patent Application Publication 108886282 ("Siemens") discloses cooling oil flowing inside a slot, so that the conductors within the slot can directly contact the coolant. Siemens teaches forming a coolant channel between the main insulation and the insulation of each conductor. However, to maintain the smooth flowing of the cooling fluid, the coolant channels are required to be at least a certain size to avoid an undesirable pressure drop.

U.S. Pat. No. 8,629,585 ("Bradfield") also discloses coolant flows along a cooling channel within each slot. Unlike Siemens, however, where all conductors are surrounded by the coolant, Bradfield discloses that only the conductor near the bottom of the slot directly contacts the coolant. Likewise, U.S. Pat. No. 9,099,900 also discloses flowing coolant in a slot, except that the coolant is firstly guided radially and then distributed to an axial coolant channel in the slot.

International Application 2018/218314 discloses providing multiple in-slot cooling channels for a concentric winding. To prevent coolant leakage to the air gap, a sealing insulation material is provided in the slot, which is an improvement over other in-slot direct cooling systems.

SUMMARY

The present inventors observed that, when the conductor of the highest temperature is cooled efficiently, the temperature of the whole electric motor may be much reduced. Accordingly, according to one embodiment of the present invention, an in-slot cooling system in a stator stack may include: (a) two or more conductors of a hairpin winding provided within each slot in a first group of the slots, each conductor running axially across the stator stack and being at a different predetermined radial distance from an air gap; and (b) adjacent each slot of the first group of slots at the end that is in the vicinity of the air gap, a bridge portion of the laminating material that closes the slot and forms in the stator stack substantially adjacent the conductor having the shortest predetermined distance from the air gap an axial cooling channel that allows a coolant to flow therein without leakage therefrom.

In one embodiment, the in-slot oil cooling system cools the hottest conductors in the slot through cooling channels that are formed by closing the slots, without requiring cooling pipes. The closed slot also prevents leakage of the coolant oil from the slot. The in-slot oil cooling system may include (a) an inlet distribution ring assembly, (b) one or more axial coolant channels within each slot, and (c) an outlet collection ring assembly. The inlet distribution ring assembly may include an inlet pipe connected to a hollow circular ring with multiple finger-type tubes, which extend into the stator slots and guide the coolant into the axial cooling channels. The outlet collection ring assembly may be structurally similar to the inlet distribution ring assembly, except that oil flows in reverse—i.e., from one or more finger-type tubes out of the cooling channels in the slot into a collection ring, and then exits through an outlet pipe. The in-slot cooling channel may be formed by a closed slot bridge or a slot wedge and a slot liner below the conductor in the slot that is closest to the air gap.

The present invention takes advantage of hairpin windings, which are inserted axially, thereby allowing the closing of the slots to form an axial oil channel at the top of each slot. The axial coolant path is therefore located alongside the hottest conductor, and thus most effective in dissipating the heat in the winding.

As compared to a conventional open-slot profile, the height of the neck of the slot (i.e., the distance between the air gap and the closest conductor) becomes longer along the radial direction to allow the slot wedge to move upwards accordingly, so that a cavity may be formed for coolant flow. (A slot wedge or a slot liner below the conductor is optional.) Without a slot wedge or a slot liner, the coolant oil may directly contact the conductor to achieve better cooling. The number of cooling channels along the circumference of the stator are flexible. For example, the number of cooling channels may equal the number of slots. This may be achieved by closing all the stator slots. Alternatively, in some embodiments, alternate ones of the slots are closed. In that arrangement, the number of cooling channels maybe half the total number of slots. Other options include closing only selected portions of the stator slots (e.g. a 180-degree sector or a 120-degree sector)

According to one embodiment of the present invention, the coolant directly cools the conductor with a higher temperature without requiring any additional part in the slot. As hairpin manufacturing involves inserting wires from the end of the stator stack, rather than inserting the wires radially from a slot opening, the slot may be closed. Also, as cooling oil is electrically non-conducting, the cooling oil may directly contact the motor parts, unlike a water-based coolant.

The present invention is better understood upon consideration of the detailed description below, in conjunction with the accompanying drawings.

DETAILED DESCRIPTION OF THE PREFERRED EMBODIMENTS

Figure 1:
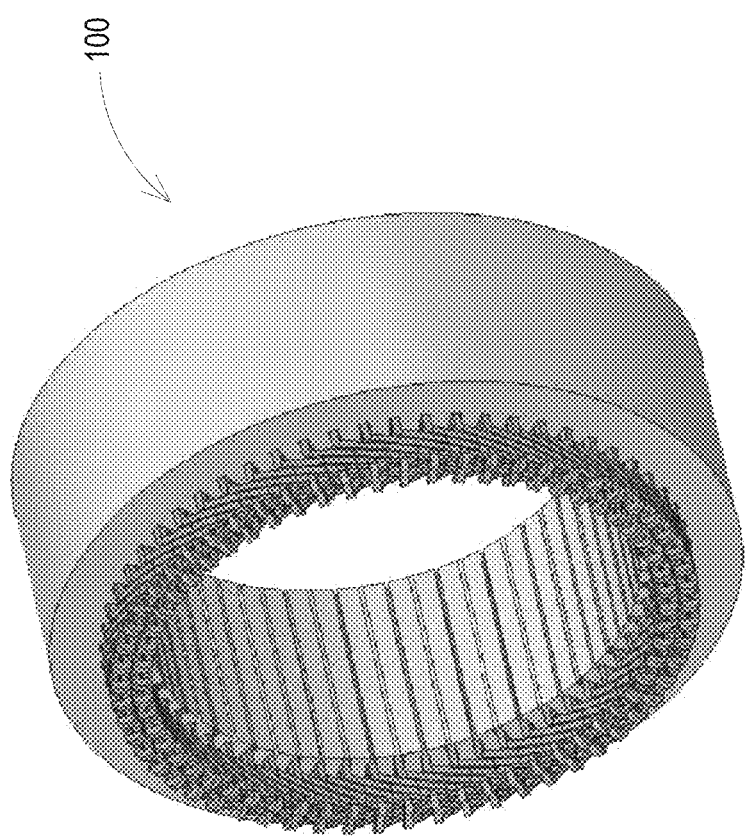
FIG. 1 shows the end-turn winding profile of an electric machine stator stack 100 with a hairpin winding, providing a uniform discrete end-turns architecture.
Figure 2:
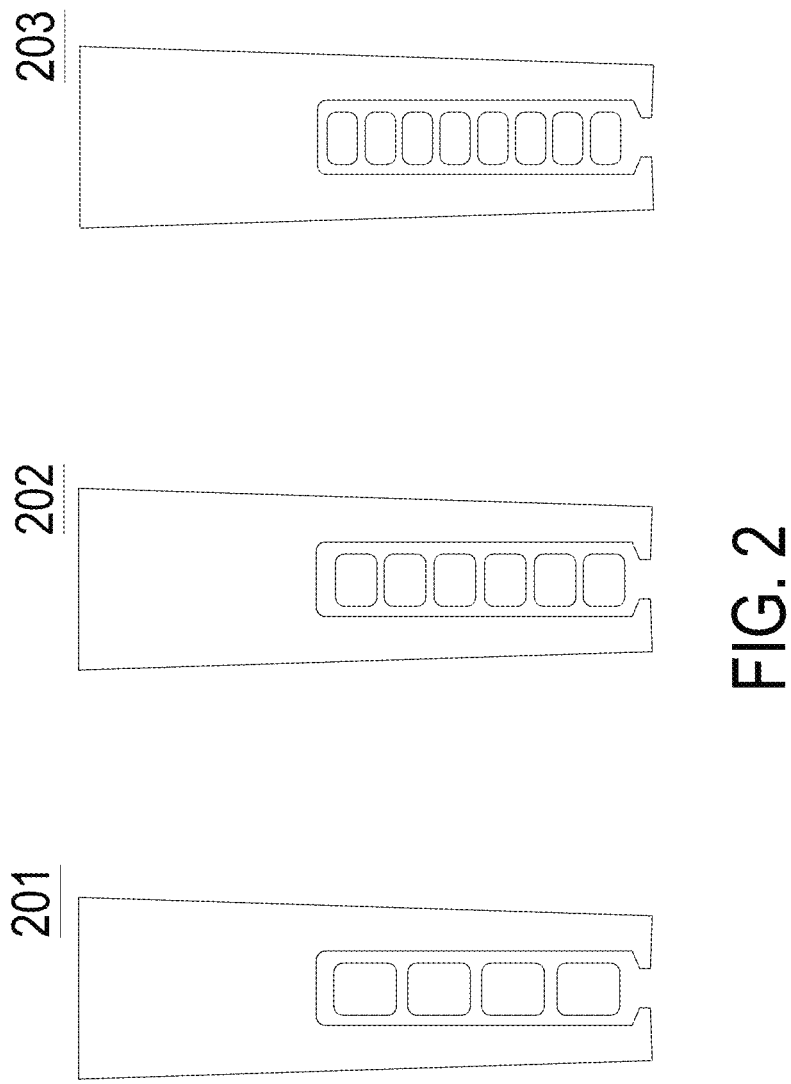
FIG. 2 shows cross-sections 201, 202, and 203, each of a slot in a stator of an electric machine, having 4-wires per slot, 6-wires per slot, and 8-wires per slot, respectively.
Figure 3:
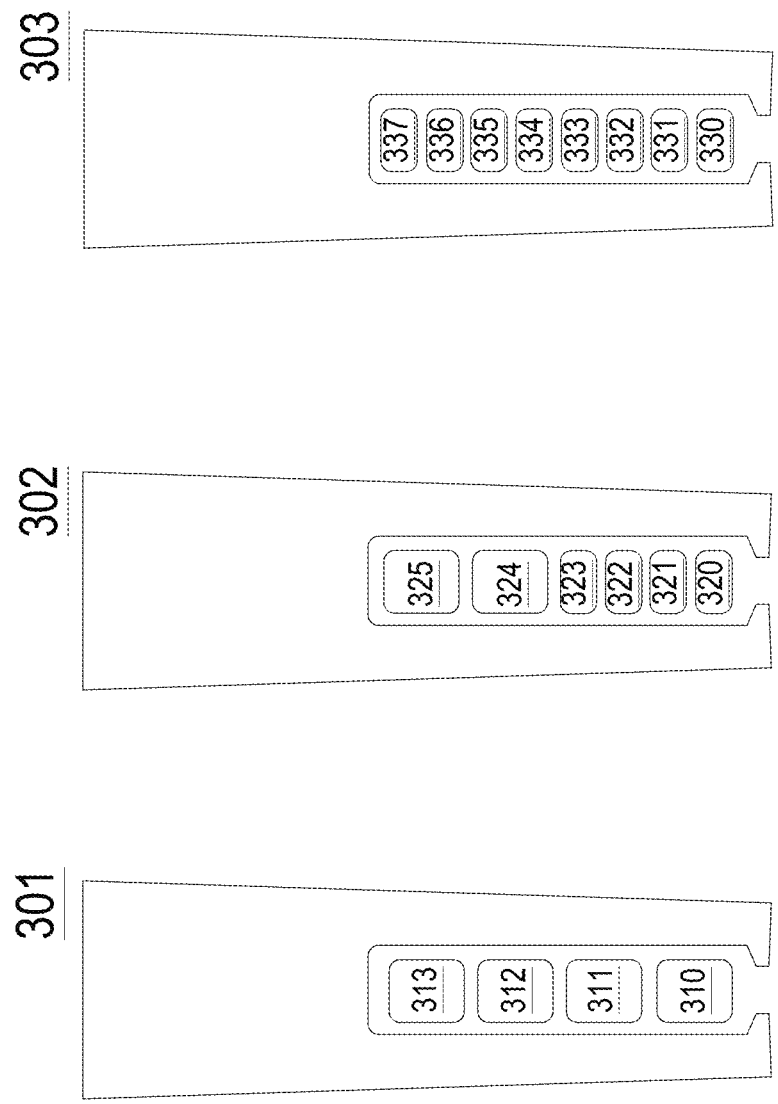
FIGS. 3(a), 3(b), and 3(c) show cross-sections 301, 302, and 303, each of a slot in a stator of an electric machine, having 4-wires per slot, 6-wires per slot, and 8-wires per slot, respectively, with variations in identical parallel branches and series turns per phase.
Figure 4:
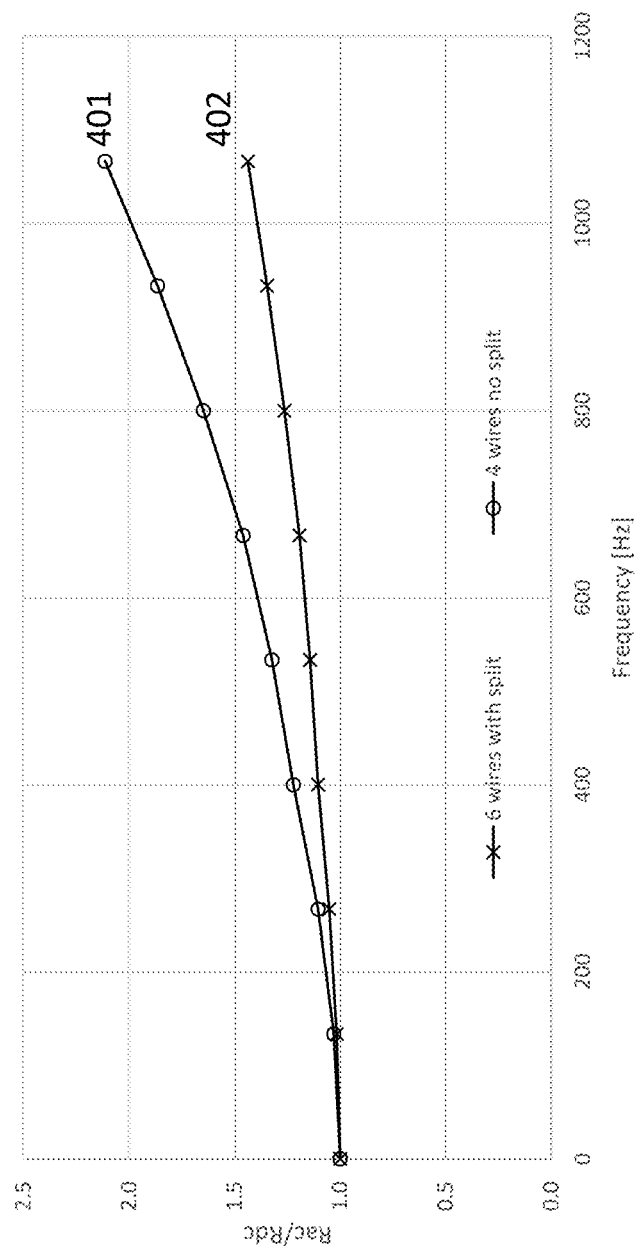
FIG. 4 shows the AC effect 401 and 402, corresponding to the wiring configurations of cross-section 301 and 302.
Figure 5B:
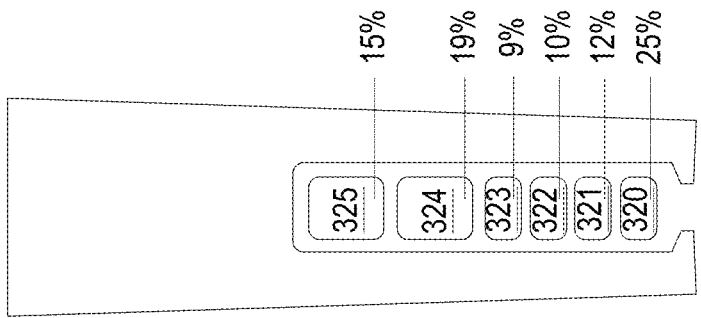
FIGS. 5(a) and 5(b) show, for cross-sections 301 and 302, respectively, the loss distribution of the wires within each slot.
Figure 5A:
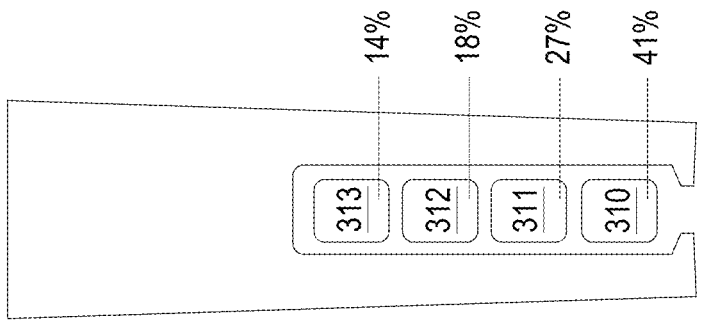
Figure 6:
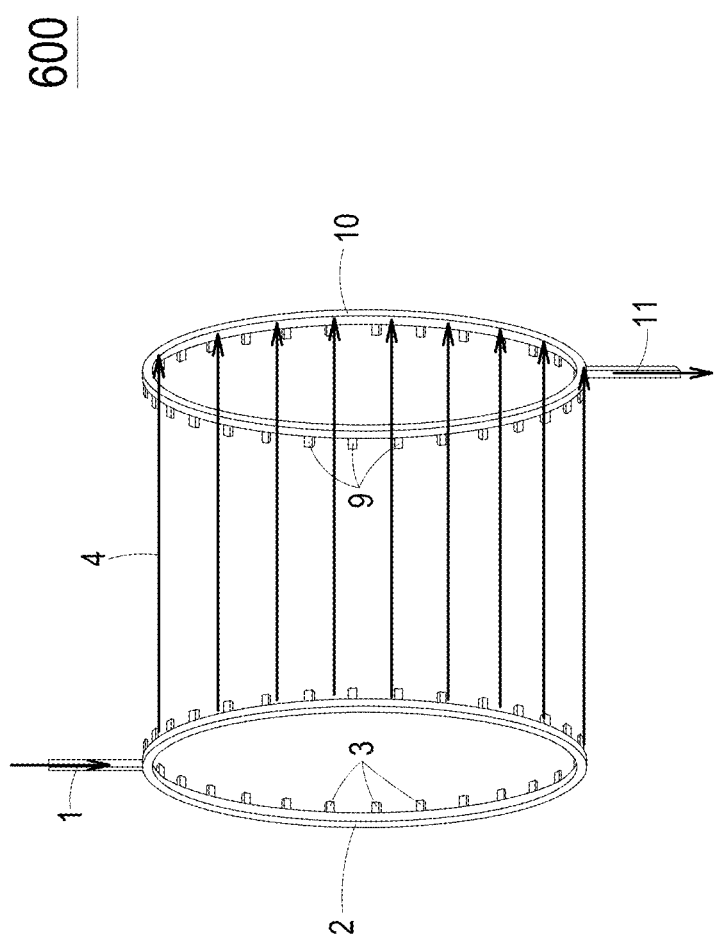
FIG. 6 shows in-slot oil cooling system 600, which includes inlet pipe 1 that feeds into hollow circular distribution ring 2, finger-type short tubes 3 and 9, circular collection ring 10, and outlet pipe 11, according to one embodiment of the present invention.
Figure 7A:
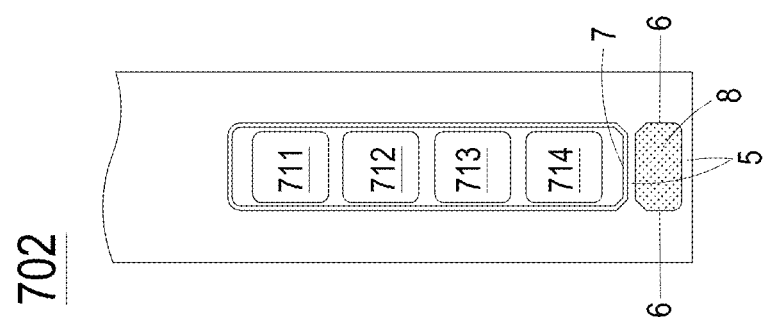
FIGS. 7(a) and 7(b) are possible cross-sections 701 and 702 of a stator slot each taken in a plane parallel to the plane of circular distribution ring 2 of FIG. 6, according to one embodiment of the present invention.
Figure 7B:
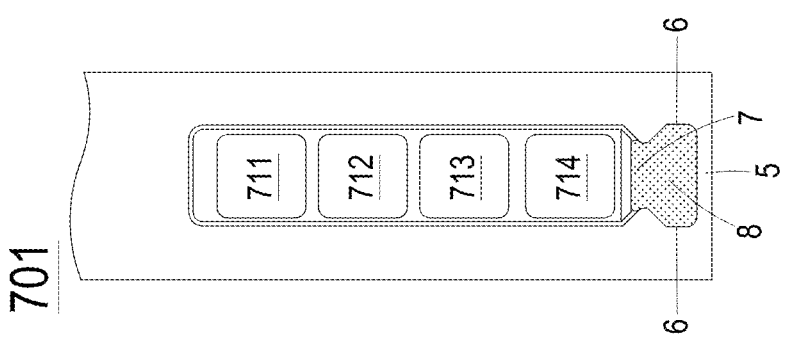

According to one embodiment of the present invention, FIG. 6 shows in-slot oil cooling system 600, which includes inlet pipe 1 that feeds into hollow circular distribution ring 2. Circular distribution ring 2 distributes coolant oil 8 into numerous finger-type short tubes 3. Each of finger-type short tubes 3 extends into a stator slot by a predetermined axial length to guide the coolant oil 8 into the slot. FIGS. 7(a) and 7(b) are possible cross-sections 701 and 702 of a slot in the stator, each cross-section being taken in a plane substantially parallel to the plane of circular distribution ring 2 of FIG. 6, according to one embodiment of the present invention. As shown in each of FIGS. 7(a) and 7(b), four conductors 711-714 are surrounded by insulative wall 7. Leaving one of finger-type short tubes 3, coolant oil 8 flows in the slot axially along cooling channel 4, which is formed by a portion of the lamination that closes the slot ("slot bridge" 5), lamination wall 6, and insulative wall 7. In FIG. 7(b), rather than in direct contact with insulative wall 7, cooling channel 4 is separated from insulative wall 7 by an additional section of the lamination (for convenience, also referred to as "slot bridge" 5). In some embodiments, the slot may also include a slot wedge (not shown). Unlike the slot of cross-section 301 in FIG. 5, each of cross-sections 701 and 702 shows a slot which is closed by slot bridge 5, so that coolant oil 8 in cooling channel 4 does not leak out of the slot. At the other end of cooling channel 4 (FIG. 6), one of finger-type short tubes 9 is inserted into cooling channel 4 and overlaps cooling channel 4 by a predetermined axial length. Coolant oil 8 is guided by the inserted finger-type short tube 9 into circular collection ring 10 and then exits through outlet pipe 11.

Inlet finger-type short tubes 3 and outlet finger-type short tubes 9 may each have an axial length that may be determined from the clearance of the adjacent copper bars extending from the slot that insert the conductors. For a small electric motor, the teeth of the slot may be narrow, such that the end clearance may be too narrow to accommodate inlet pipe 1 near stator stack (not shown). In that situation, finger-type short tubes 3 and 9 may be lengthened to the outside of the envelope of the end windings, where inlet pipe 1 may connect.

Figure 8:
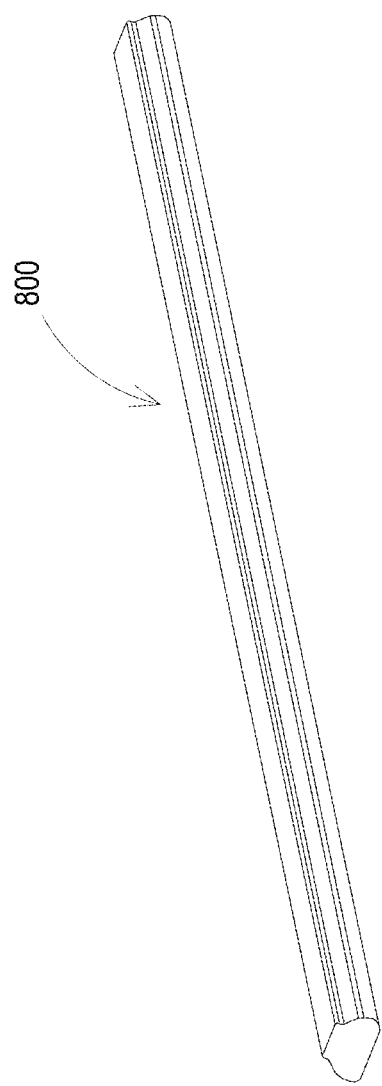
FIG. 8 shows in-slot cooling channel 4 formed out of a hollow pipe 800 that is inserted into the slot, according to one embodiment of the present invention.
Figure 9:
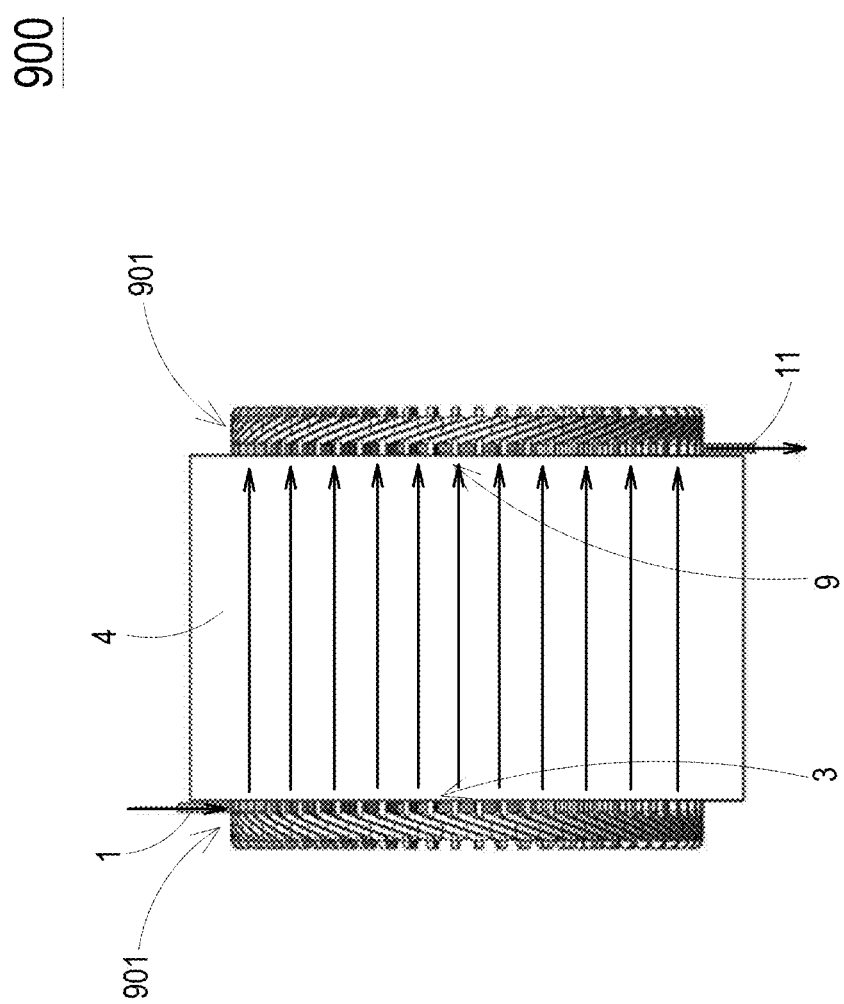
FIG. 9 shows a side view of stator 900 having a hairpin winding, inlet pipe 1, finger-type short tubes 3, finger-type short tubes 9, and outlet pipe 11, according to one embodiment of the present invention; the axial coolant flows in cooling channels 4 are also indicated.

In-slot cooling channel 4 may be any hollow—preferably non-conductive—pipe inserted into the slot, such as hollow pipe 800 of FIG. 8, corresponding to the cooling channel profile (i.e., cross-section 701) of FIG. 7(a). However, for an automotive electric machine, the available space in the slot may be too limited to allow room for inserting a hollow pipe. Since a separate hollow pipe would have a wall with at least a minimal thickness, a significant pressure drop along the pipe may result from the pipe's cross-sectional area. The wall of the pipe may also provide additional thermal resistance. Thus, the present invention does not require the use of a hollow pipe in cooling channel 4. Instead, as the coils of a hairpin winding are inserted axially, rather than from the openings of the slot, a hairpin winding allows a stator slot to be closed, thus forming a sealed cavity beside the conductors in the slot. FIG. 9 shows a side view of stator 900 having hairpin winding 901, inlet pipe 1, finger-type short tubes 3, finger-type short tubes 9, and outlet pipe 11. The axial coolant flows in cooling channels 4 are also indicated.

Figure 10:
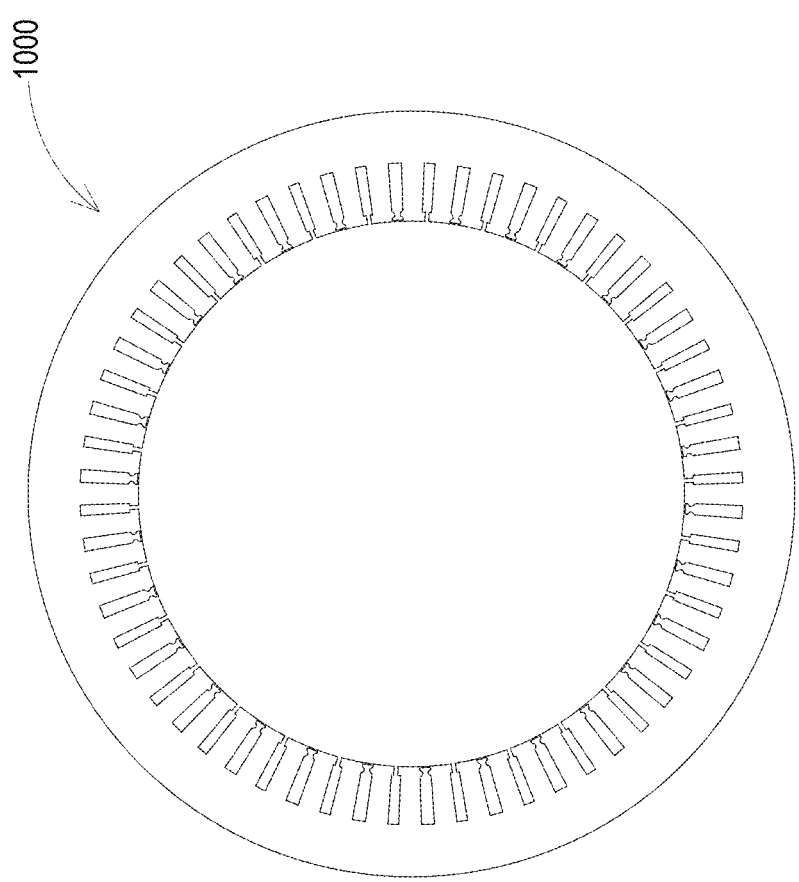
FIG. 10 shows stator lamination 1000 with alternate closed slots, according to one embodiment of the present invention.
Figure 11:
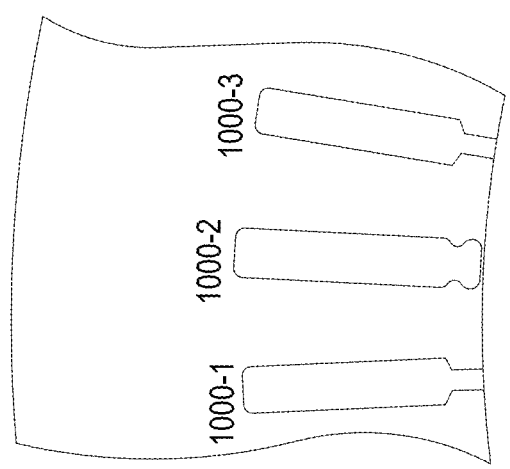
FIG. 11 provides a detailed view of adjacent slots 1000-1, 1000-2, and 1000-3 of stator lamination 1000, showing closed slots 1000-2 and open slots 1000-1 and 1000-3.

According to one embodiment of the present invention, FIG. 10 shows stator lamination 1000 with alternate closed slots. FIG. 11 provides a detailed view of adjacent slots 1000-1, 1000-2, and 1000-3 of stator lamination 1000, showing closed slots 1000-2 and open slots 1000-1 and 1000-3.

Figure 12:
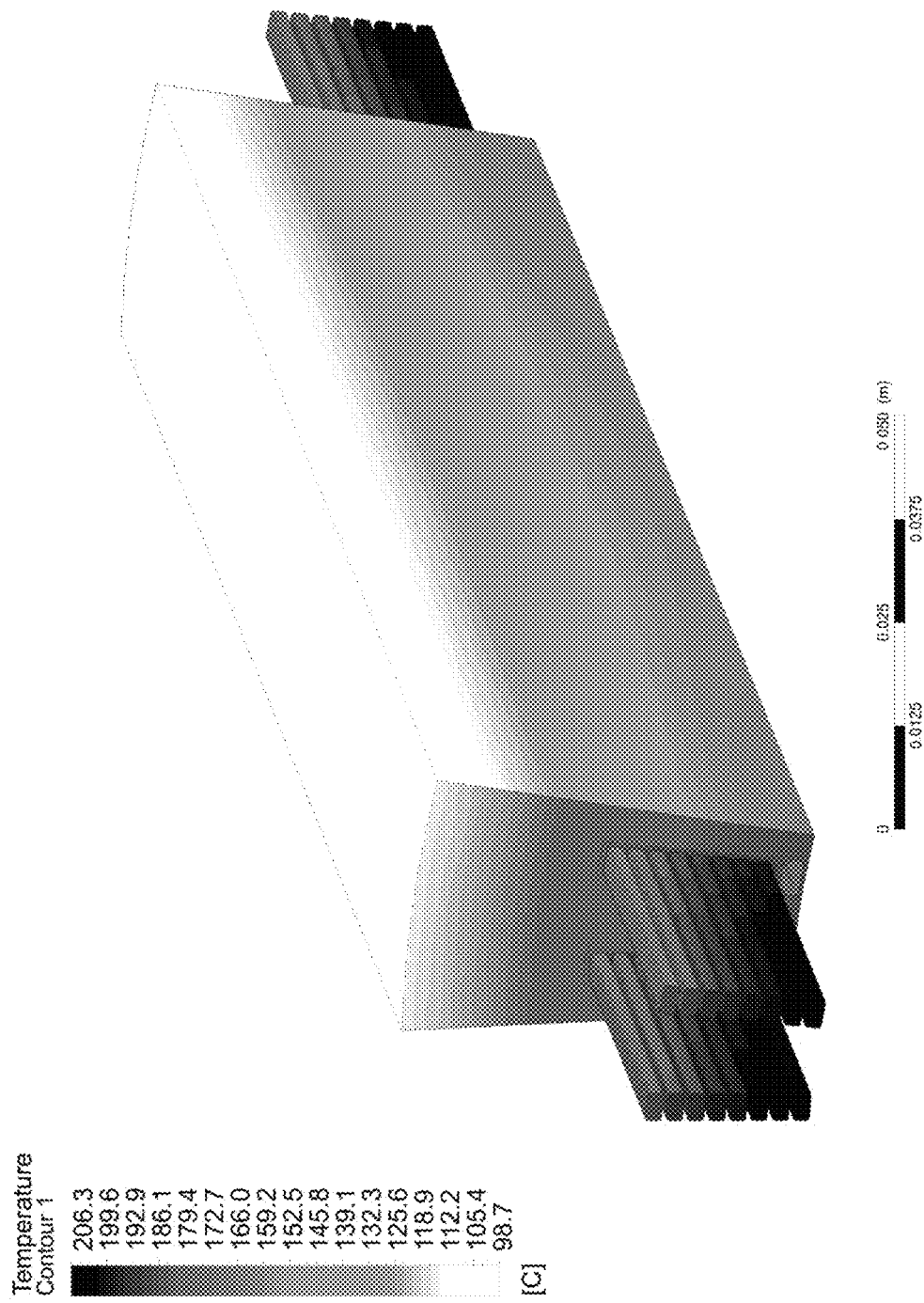
FIG. 12 is a temperature distribution in a simulation of a truck tractor motor working at full load, cooled only with a water jacket.
Figure 13:
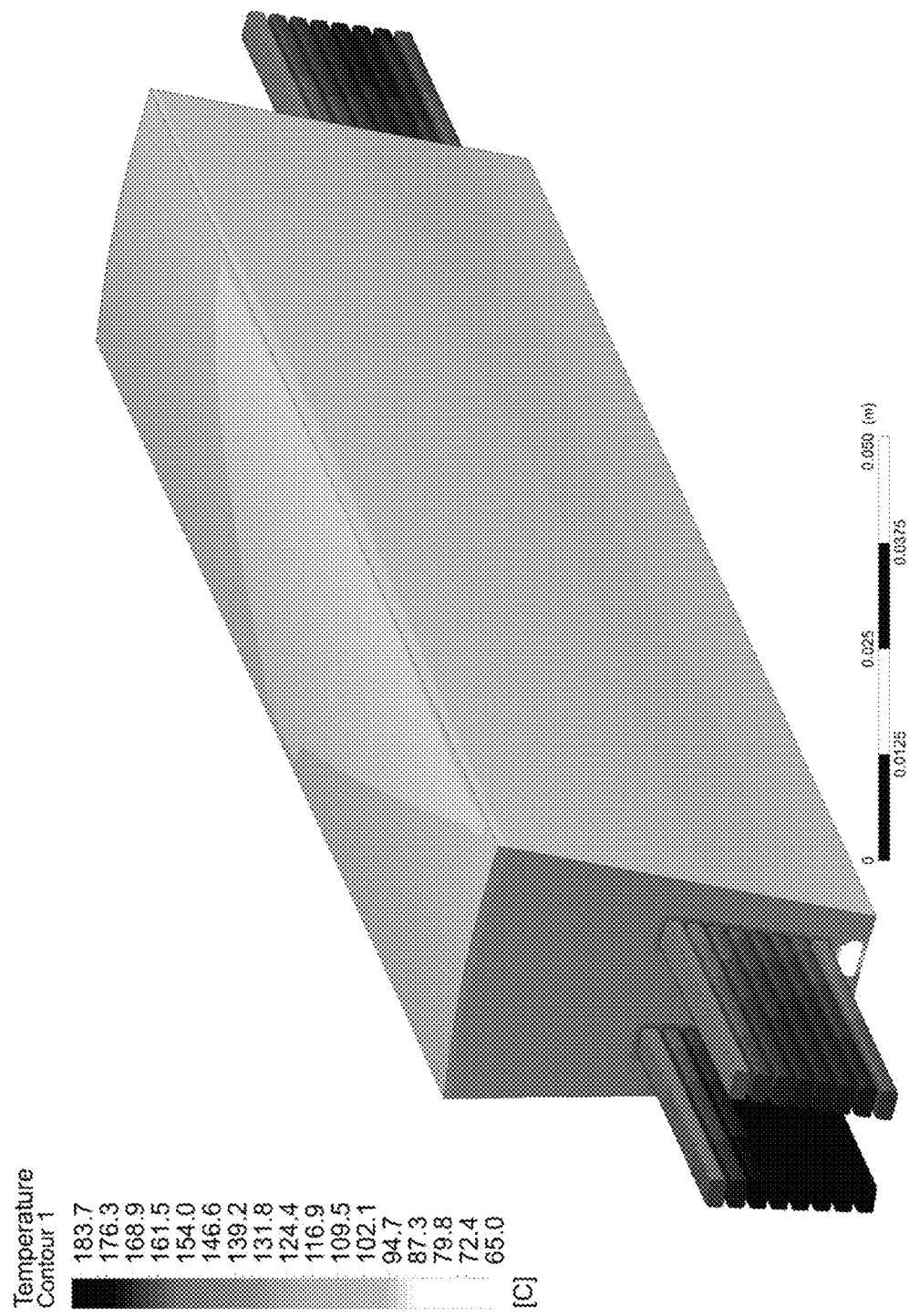
FIG. 13 is a temperature distribution in a simulation of a truck tractor motor working at full load, cooled under the cooling system of FIG. 9, when the truck tractor motor has stator lamination 1000 of FIG. 1.

FIG. 12 is a temperature distribution in a simulation of a truck tractor motor working at full load, cooled only with a water jacket. As shown in FIG. 12, the maximum temperature (206.3° C.) is detected at the bottom conductor closest to the air gap. FIG. 13 is a temperature distribution in a simulation of a truck tractor motor working at full load, cooled under the cooling system of FIG. 9, the truck tractor motor having stator lamination 1000 of FIG. 10. As shown in FIG. 13, the maximum temperature drops to 183.7° C., at a total oil flow rate of 12 liters/minute and an inlet temperature of 65° C., even when the slot is provided a slot liner and a slot wedge between cooling channel 4 and the conductors. Without the slot liner and the slot wedge, the maximum temperature is expected to be even lower.

Figure 14:
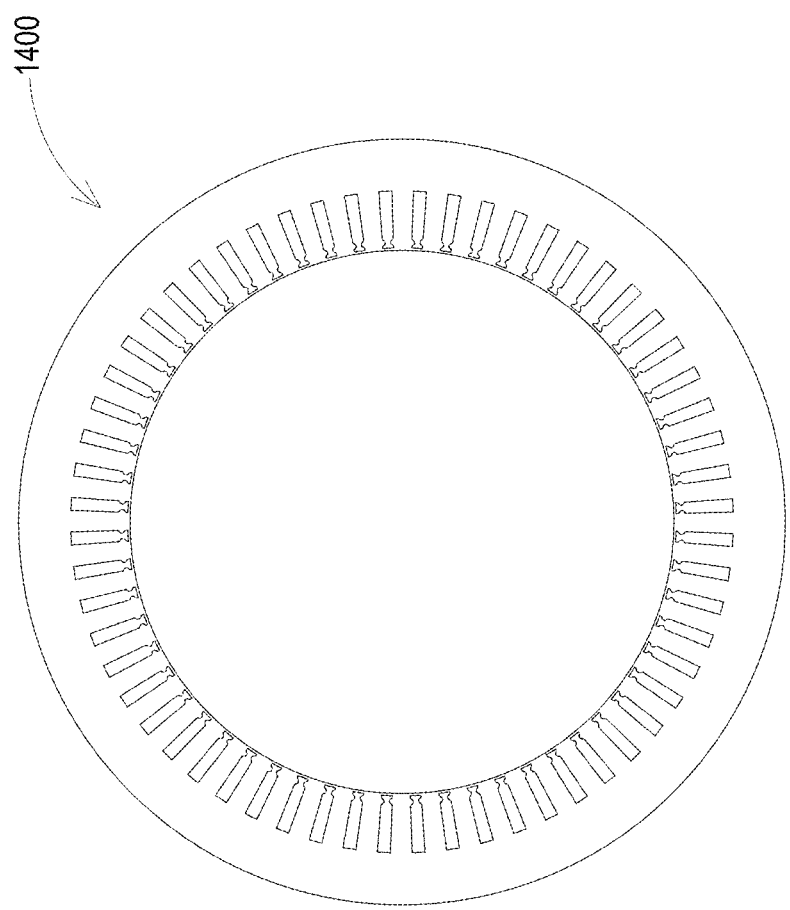
FIG. 14 shows stator lamination 1400 with all closed slots, according to one embodiment of the present invention.
Figure 15:
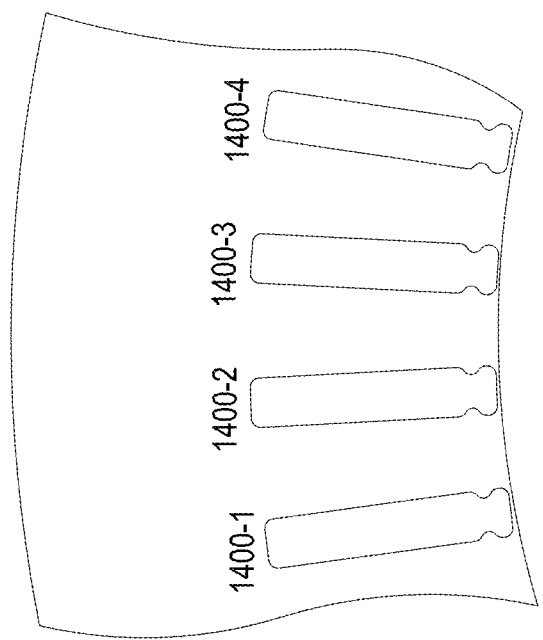
FIG. 15 provides a detailed view of adjacent slots 1400-1, 1400-2, 1400-3, and 1400-4 in stator lamination 1400, showing these adjacent slots to all be closed.

FIG. 14 shows stator lamination 1400 with all closed slots, according to one embodiment of the present invention. FIG. 15 provides a detailed view of adjacent slots 1400-1, 1400-2, 1400-3, and 1400-4 of stator lamination 1400, showing these adjacent slots to all be closed. The in-slot cooling effect under the present invention is believed to be even more significant.

Figure 16:
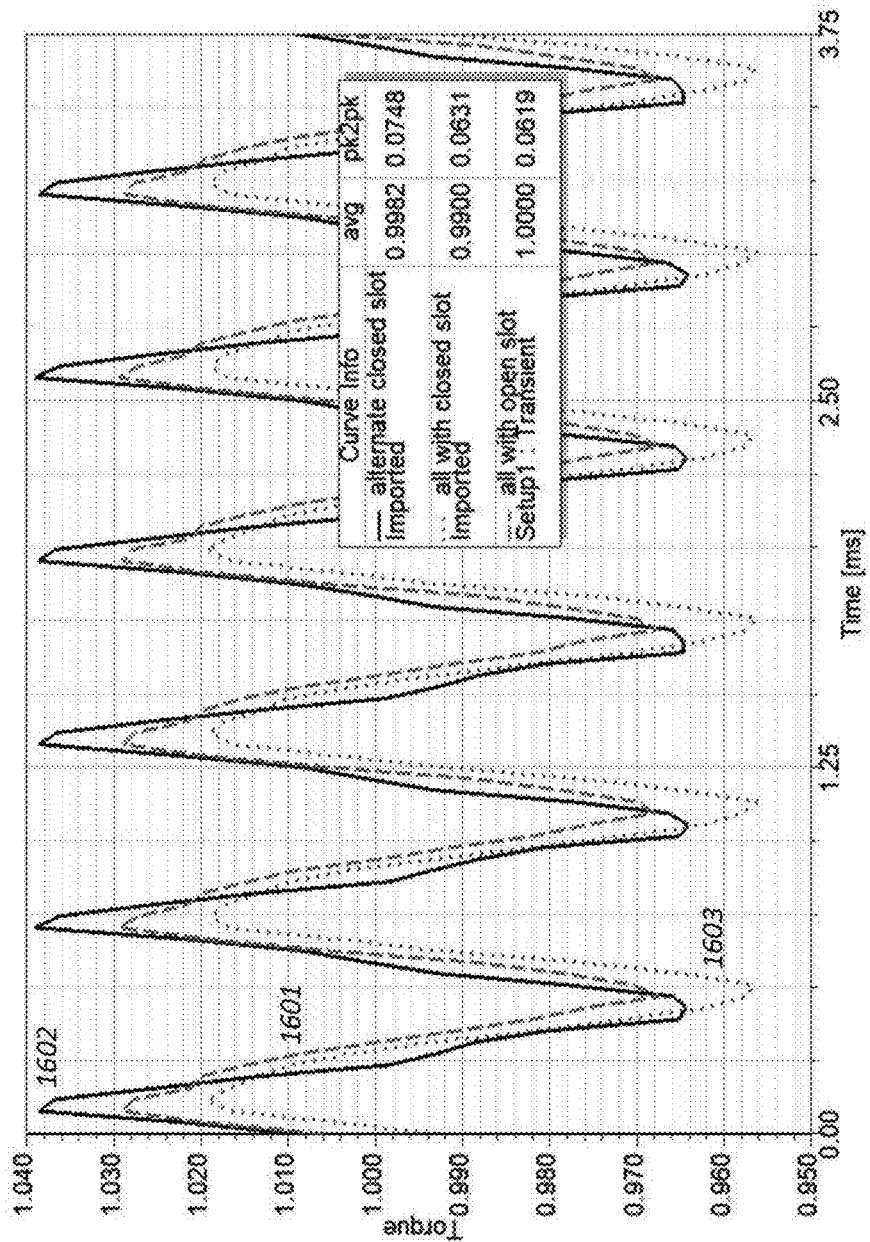
FIG. 16 shows the torque and torque ripple change with the same driven current and phase angle under all-open, alternate-closed (FIG. 10), and all-closed (FIG. 14) slot configurations.

FIG. 16 shows the torque and torque ripple change with the same driven current and phase angle under all-open, alternate-closed (FIG. 10), and all-closed (FIG. 14) slot configurations. Waveform 1601 corresponds to the electromagnetic torque under a conventional all-open slot configuration, waveform 1602 corresponds to the electromagnetic torque under an alternate-closed slot configuration (as shown in FIG. 10), and waveform 1603 corresponds to the electromagnetic torque under an all-closed slot configuration (as shown in FIG. 14). As shown in FIG. 16, relative to the all-open slot configuration, the average electromagnetic torque with alternate-closed slot configuration decreases by 0.2%, and the torque ripple increases to 7.48% from 6.19%. Likewise, the average electromagnetic torque for an all-closed slot configuration decreases by 1%, and the torque ripple increases to 6.31% from 6.19%. Thus, the present invention achieves a substantial improvement in thermal performance without any significant compromise in average electromagnetic torque and torque ripple.

The above-detailed description is provided to illustrate specific embodiments of the present invention and is not intended to be limiting. Numerous variations and modifications within the scope of the present invention are possible. The present invention is set forth in the accompanying claims.

We claim:

1. In a stator stack formed of laminated material and having a plurality of slots, each slot having one end in the vicinity of an air gap, an in-slot cooling system, which comprises:
    two or more conductors of a hairpin winding provided within each slot in a first group of the slots, each conductor running axially across the stator stack and being at a different predetermined radial distance from the air gap;
    adjacent each slot of the first group of slots at the end that is in the vicinity of the air gap, a bridge portion of the laminating material that closes the slot and forms in the stator stack substantially adjacent to the conductor having the shortest predetermined distance from the air gap an axial cooling channel that allows a coolant to flow therein without leakage therefrom, and wherein the conductor having the shortest predetermined distance from the air gap is separated from the axial cooling channel by a second bridge portion of the lamination material; and
    an inlet distribution ring assembly comprising one or more inlet pipes, inlet finger-type tubes, and a distribution conduit, wherein the coolant flows from the inlet pipes to the distribution conduit, and from the distribution conduit into the cooling channels through the inlet finger-type tubes.

2. The in-slot cooling system of claim 1, wherein the conductors are rectangular.

3. The in-slot cooling system of claim 1, further comprising an electrically insulating slot liner in each slot, each slot liner surrounding the conductors of the slot.

4. The in-slot cooling system of claim 1, further comprising a slot wedge in each slot.

5. The in-slot cooling system of claim 1, wherein the first group of slots comprise all slots in the stator stack.

6. The in-slot cooling system of claim 1, wherein the first group of slots comprise alternate ones of all slots in the stator.

7. The in-slot cooling system of claim 1, wherein the first group of slots comprise less than all slots in the stator.

8. The in-slot cooling system of claim 1, wherein the axial cooling channel allows the coolant to directly contact with the conductor having the shortest predetermined distance from the air gap.

9. The in-slot cooling system of claim 1, wherein the distribution conduit comprises a circular ring.

10. The in-slot cooling system of claim 1, wherein the inlet finger-type tubes guide the coolant from the distribution conduit into the cooling channels.

11. The in-slot cooling system of claim 10, wherein each cooling channel is associated with a single inlet finger-type tube.

12. The in-slot cooling system of claim 1, further comprising an outlet distribution ring assembly comprising one or more outlet pipes and a collection conduit, wherein the coolant flows from the cooling channels into the collection conduit, from which the coolant exits the stator through the outlet pipes.

13. The in-slot cooling system of claim 12, further comprising outlet finger-type tubes that guide the coolant from the cooling channels into the collection conduit.

14. The in-slot cooling system of claim 13, wherein each cooling channel is associated with a single outlet finger-type tube.

15. The in-slot cooling system of claim 12, wherein the collection conduit comprises a circular ring.

16. The in-slot cooling system of claim 1, wherein the first group of slots encompass an arc of adjacent slots in the stator.

17. The in-slot cooling system of claim 16, wherein the arc covers 120° or 180° of adjacent slots in the stator.

18. The in-slot cooling system of claim 1, further comprising a hollow tube that encloses each cooling channel.

\* \* \* \* \*